Dec. 21, 1926.

W. L. BRAAI 1,611,331

FAUCET VALVE

Filed Oct. 6, 1925

Inventor
William L. Braai

By D. Swift

Attorney

Patented Dec. 21, 1926.

UNITED STATES PATENT OFFICE.

WILLIAM L. BRAAI, OF NEW ORLEANS, LOUISIANA.

FAUCET VALVE.

Application filed October 6, 1925. Serial No. 60,810.

The invention relates to faucet valves, and has for its object to provide the faucet valve with a stem, which stem extends downwardly into a pipe and forms means for maintaining the ball valve or other similar operating member unseated in relation to a valve seat carried by the pipe during ordinary movement of the faucet valve. The stem, when the valve is removed from the faucet valve casing allows the ball valve or other similar operating member to seat, thereby allowing repair of the faucet valve, such for instance as placing a new washer thereon, or other minor repairs to faucet valves, without the necessity of cutting off the water system.

A further object is to dispose the washer valve seat on the upper side of a flange carried by the pipe and the ball valve seat or any type most convenient and desirable operating means, on the under side of the flange, thereby allowing both seats to be formed on the same plane affixed to a faucet valve for the purpose designed and desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
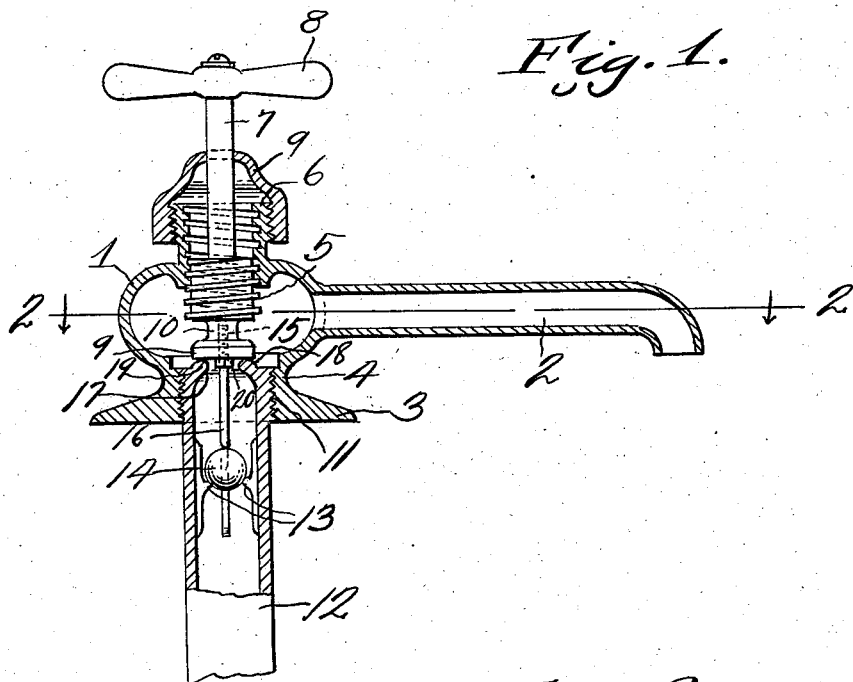
Figure 1 is a vertical longitudinal sectional view through the faucet valve.
Figure 2:
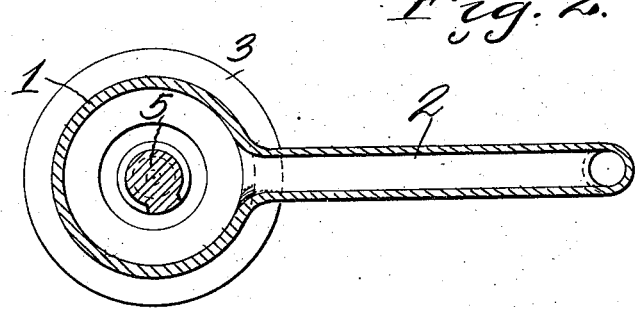
Figure 2 is a horizontal sectional view taken on line 2—2 of Figure 1.

Referring to the drawing, the numeral 1 designates the faucet valve casing and 2 the discharge spout carried thereby. The casing 1 is provided with a conventional form of flange or similar member 3 carried by the extension 4, whereby the faucet valve may be supported in the usual manner on the wash basin or in any other position. Disposed within the casing 1 is a threaded barrel 5, which is threaded into the upwardly extending member 6 of the valve casing, and which barrel at its upper end is provided with a stem 7, the upper end of which terminates in a handle member 8, and by means of which handle member the barrel 5 may be unthreaded upwardly or downwardly for turning on or cutting off the flow of water through the faucet valve as desired. The upwardly extending member has threaded thereon a conventional form of cap 9, which cap is unthreaded when it is desired to remove the barrel 5 for minor repair or for renewing the washer 9 carried by the extension 10 of the barrel.

Threaded at 11 into the casing extension 4 is a pipe 12, which pipe has disposed therein stop lugs 13, which limit the downward movement of the ball valve or other operating member 14. Threaded at 15 into the extension 10 is a valve stem 16, which valve stem extends downwardly into the pipe 12, and forms means for cooperating with the ball valve or other operating member 14 for maintaining the same unseated in relation to the ball valve or other desirable operating member seat 17 during the operation of the faucet valve, for allowing or cutting off the flow of water. However it will be seen when the cap 9 is removed and the barrel 5 removed from the casing 1, at which time the stem 16 is removed, the ball valve, or desirable operating member 14, under the pressure of the water, will immediately seat on the valve seat 17, thereby allowing repairs to be made to the faucet valve without the necessity of cutting off the flow of water through the house or system. Washer 9 cooperates with the valve seat 18 adjacent the valve seat 17, and it will be noted that both of said seats are carried by the same member 19, therefore it will be seen that the cost of manufacture is reduced to a minimum. The valve stem 16 is provided with an enlargement 20, preferably in the form of a nut or any other type preferred, which will engage the washer 9 that will hold said washer on the extension 10, and it will be seen that the stem 16 has a double function, for maintaining and operating the faucet valve.

From the above it will be seen that a faucet valve is provided which is provided with an auxiliary valve means 14, which is normally held in inoperative position, when the valve is assembled, but which will immediately seat when the valve is disassembled, for instance when it is desired to renew the washer therein or other repairs without the necessity of turning off the water system which is very inconvenient from the present methods now in use involving a lot of unnecessary time, labor and expense.

The invention having been set forth what is claimed as new and useful is:—

A faucet valve comprising a casing, a supply pipe threaded into said casing, a valve seat carried by the inner end of the supply pipe and convexed on its outer face, a valve stem, a washer carried by said valve stem and cooperating with the valve seat, a ball valve in the supply pipe, a concaved valve seat carried by the upper end of the supply pipe and with which the ball valve cooperates, a stem carried by the valve stem and cooperating with the ball, said valve seats being formed integral with the upper end of the supply pipe.

In testimony whereof I have signed my name to this specification.

WILLIAM L. BRAAI.